United States Patent
Gao et al.

(10) Patent No.: US 9,549,117 B2
(45) Date of Patent: Jan. 17, 2017

(54) METHOD AND APPARATUS FOR ADJUSTING OPTICAL CENTRE

(71) Applicant: Xiaomi Inc., Beijing (CN)

(72) Inventors: Yuan Gao, Beijing (CN); Shuo Zhang, Beijing (CN); Shibo Li, Beijing (CN)

(73) Assignee: XIAOMI INC., Haidian District, Beijing (CN)

( * ) Notice: Subject to any disclaimer, the term of this patent is extended or adjusted under 35 U.S.C. 154(b) by 129 days.

(21) Appl. No.: 14/264,063

(22) Filed: Apr. 29, 2014

(65) Prior Publication Data

US 2015/0036036 A1    Feb. 5, 2015

Related U.S. Application Data

(63) Continuation of application No. PCT/CN2014/072283, filed on Feb. 20, 2014.

(30) Foreign Application Priority Data

Aug. 1, 2013    (CN) .......................... 2013 1 0331948

(51) Int. Cl.
*H04N 5/225*    (2006.01)
*H04N 5/232*    (2006.01)
(Continued)

(52) U.S. Cl.
CPC ...... *H04N 5/23222* (2013.01); *G01M 11/0221* (2013.01); *G02B 27/62* (2013.01);
(Continued)

(58) Field of Classification Search
CPC .................................................. H04M 1/0264
See application file for complete search history.

(56) References Cited

U.S. PATENT DOCUMENTS 7,727,009 B2 *    6/2010    Goto .................... B60Q 3/0203
                                                    362/396
2004/0264764 A1 *    12/2004    Kochi .................... G01B 15/04
                                                    382/154
(Continued)

FOREIGN PATENT DOCUMENTS

CN          1393034 A        1/2003
CN        101459102 A        6/2009
(Continued)

OTHER PUBLICATIONS

Quan, Long; "Self-Calibration of an Affine Camera from Multiple Views"; International Journal of Computer Vision 19(1), 93-105, 1996.*
(Continued)

*Primary Examiner* — Twyler Haskins
*Assistant Examiner* — Dwight C Tejano
(74) *Attorney, Agent, or Firm* — Jun He Law Offices P.C.; James J. Zhu

(57)    ABSTRACT

The present disclosure discloses a method and an apparatus for adjusting an optical center. The method includes fixedly installing a viewport cover plate in a terminal device; movably installing a camera in the terminal device; and adjusting a position of the camera; wherein adjusting the position of the camera comprises adjusting a position of an optical center of the camera by aligning the optical center of the camera with a center of an external viewport on the viewport cover plate to achieve concentricity between the optical center of the camera and the center of the external viewport. The apparatus for adjusting the optical center includes a projector, a computer, and an adjusting assembly. The apparatus of the present disclosure could provide an advantage of simple operation, and each terminal device can achieve an excellent centering effect by using the apparatus.

13 Claims, 3 Drawing Sheets

(51) Int. Cl.
*G06T 7/00* (2006.01)
*G02B 27/62* (2006.01)
*G01M 11/02* (2006.01)

(52) U.S. Cl.
CPC ......... *G06T 7/0018* (2013.01); *H04N 5/2251* (2013.01); *H04N 5/2257* (2013.01); *H04N 5/23293* (2013.01)

(56) References Cited

U.S. PATENT DOCUMENTS

| | | | | |
|---|---|---|---|---|
| 2006/0088226 | A1* | 4/2006 | Abe | G06K 9/42 382/298 |
| 2007/0127101 | A1* | 6/2007 | Oldroyd | G01C 11/00 359/24 |
| 2011/0255000 | A1* | 10/2011 | Weber | G03B 17/02 348/374 |
| 2014/0118500 | A1* | 5/2014 | Liu | H04N 13/0203 348/46 |

FOREIGN PATENT DOCUMENTS

| | | |
|---|---|---|
| CN | 201757830 U | 3/2011 |
| CN | 201994977 U | 9/2011 |
| CN | 102227804 A | 10/2011 |
| CN | 102609038 A | 7/2012 |
| CN | 102810205 A | 12/2012 |
| CN | 203086550 U | 7/2013 |
| CN | 103402116 A | 11/2013 |
| JP | 1994265766 A | 9/1994 |
| JP | 1995194546 A | 8/1995 |
| JP | 1996007769 A | 1/1996 |
| JP | 2001257930 A | 9/2001 |
| JP | 2011112880 A | 6/2011 |
| KR | 1020060116569 A | 11/2006 |
| KR | 10-0723218 | 5/2007 |
| WO | 2009/069925 A1 | 6/2009 |

OTHER PUBLICATIONS

"International Search Report for PCT/CN2014/072283".

* cited by examiner

METHOD AND APPARATUS FOR ADJUSTING OPTICAL CENTRE

CROSS-REFERENCE TO RELATED APPLICATIONS

This application is a Continuation of International Application PCT/CN2014/072283, with an international filing date of Feb. 20, 2014, which claims priority from Chinese Patent Application No. 201310331948.0, filed on Aug. 1, 2013, the entire contents of which are incorporated herein by reference.

TECHNICAL FIELD

The present disclosure relates to the field of mobile communication, and more particularly, to a method and an apparatus for adjusting an optical centre.

BACKGROUND

Cameras have been widely applied as a standard configuration to a variety of terminal devices, such as mobile phones. The cameras implemented in the terminal device include a front camera and a rear camera, which are arranged at the front surface and the rear surface of the terminal device, respectively. The front camera is used for self-portraits and conference meetings, whereas the rear camera is used for general photography.

The rear camera is taken as an example and explained as follows. In the rear camera, both a viewport cover plate and the rear camera are installed in a front housing. Moreover, both of them are positioned by their individual overall dimensions. The viewport cover plate is a protective glass of a touch screen, and is printed thereon with a display screen area, a camera area, an icon area, etc., wherein the camera area is also called as an external viewport. With the user's increasing requirement for the terminal device appearance, there is a higher demand for the concentricity between the optical centre of the camera and the centre of the external viewport. Moreover, there are more and more negative user experiences because of camera deviation, i.e., concentricity error.

With the limitation of the above techniques, and the unavoidable machining tolerance of each component during production, in order to avoid the phenomenon of severe concentricity deviation between the optical centre of the camera and the centre of the external viewport, it is necessary to increase the machining accuracy and decrease the machining tolerance. The phenomenon of concentricity deviation can only be reduced, but cannot be avoided. In a mass production processing, it particularly shows regularities of distribution suggesting that some products may have an excellent yield rate, and others may not. Once the assembling is completed, the status of the concentricity deviation is fixed and cannot be adjusted. Those products having a high concentricity deviation may only be scraped or remanufactured, thus causing a high rejection rate.

SUMMARY

According to a first aspect of the embodiments of the present disclosure, there is provided a method for adjusting an optical centre, comprising: fixedly installing a viewport cover plate in a terminal device; movably installing a camera in the terminal device; and adjusting a position of the camera; wherein adjusting the position of the camera comprises adjusting a position of an optical centre of the camera by aligning the optical centre of the camera with a centre of an external viewport on the viewport cover plate to achieve concentricity between the optical centre of the camera and the centre of the external viewport.

According to a second aspect of the embodiments of the present disclosure, there is provided an apparatus for adjusting an optical centre, comprising: a projector for obtaining an orthographic projection of a camera and an external viewport on a viewport cover plate in a main view direction, wherein the viewport cover plate is fixedly installed in a terminal device and the camera is movably installed in the terminal device; a computer for setting an adjusting target and an adjusting area in accordance with the obtained orthographic projection of the camera and the external viewport; and an adjusting assembly for adjusting a position of the camera.

The technical solutions provided by the embodiments of the present disclosure may, in part, have the beneficial effects as below.

The method provided by the embodiments in the present disclosure may achieve the required concentricity between the optical centre of the camera and the centre of the external viewport by additionally implementing the step of adjusting the position of the camera after fixedly installing the viewport cover plate and movably installing the camera. Hence, each terminal device could achieve an excellent centering effect without scrapping, and the problem of high rejection rate due to a serious concentricity deviation between the optical centre of the camera and the centre of the external viewport may be solved.

In addition, the apparatus in the embodiments of the present disclosure has the advantage of ease in operation, and each terminal device can achieve an excellent centering performance by using the apparatus.

Furthermore, the present disclosure is not limited to the front camera, and also may be applied to the rear camera.

It should be understood that both the foregoing general description and the following detailed description are exemplary and explanatory only and are not restrictive of the present disclosure, as claimed.

BRIEF DESCRIPTION OF THE DRAWINGS

In order to explain the technical solutions in the embodiments of the present disclosure more apparently, a brief description of the drawings will be given below. Obviously, the drawings described below only illustrate some embodiments of the present disclosure, and for those skilled in the art, other drawings may be obtained based on these drawings without inventive effort.

The signs indicated in FIG. 2-FIG. 9 represent as follows: 1 housing; 2 viewport cover plate; 3 camera; 4 external viewport; 5 adjusting assembly; 5A X-direction adjusting assembly; 5B Y-direction adjusting assembly; 51 screw; 52 elastic sheet; 6 computer; 7 projector; 8 optical centre of camera; 9 centre of external viewport; 10 adjusting target; 11 adjusting area.

Specific embodiments in this disclosure have been shown by way of example in the foregoing drawings and are hereinafter described in detail. The figures and written description are not intended to limit the scope of the inventive concepts in any manner. Rather, they are provided to illustrate the inventive concepts to a person skilled in the art by reference to particular embodiments.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
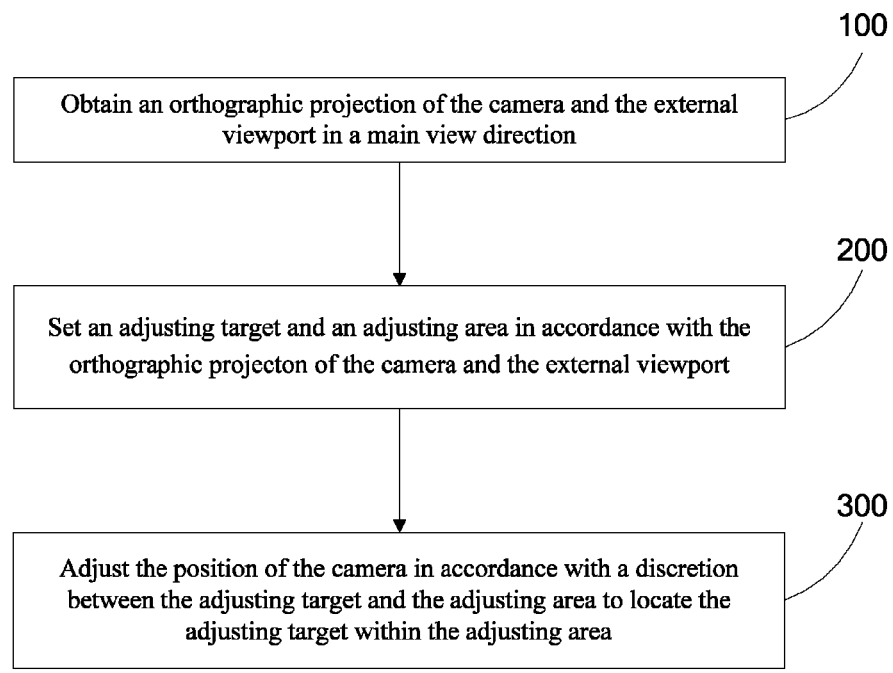
FIG. 1 is a flow chart of a method for adjusting an optical centre according to an embodiment of the present disclosure.
Figures 2, 3, 4:
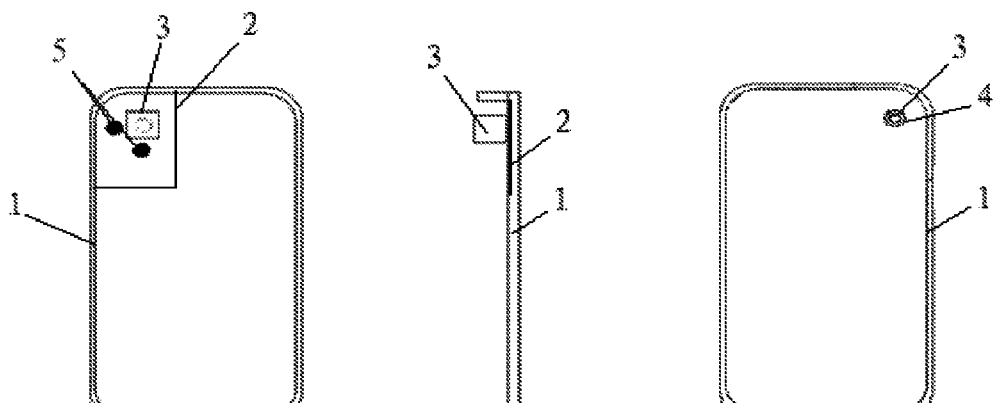
FIG. 2 is a front view of a terminal device according to an embodiment of the present disclosure.
FIG. 3 is a side view of the terminal device according to the embodiment of the present disclosure.
FIG. 4 is a back view showing that an adjusting assembly is applied to the terminal device according to an embodiment of the present disclosure.

FIG. 1 is a flow chart of a method for adjusting an optical centre according to an embodiment of the present disclosure. The present embodiment is mainly explained using FIG. 1, but FIG. 2-FIG. 9 may also be served as references. The description of the present embodiment is given by an example of a terminal device with a camera 3 (see FIG. 2) located at a rear surface of the terminal device. For example, the terminal device may be a mobile phone, a computer, a digital broadcast terminal, a messaging device, a gaming console, a tablet, a medical device, exercise equipment, a personal digital assistant, and the like.

The method of adjusting the optical centre includes fixedly installing a viewport cover plate 2 and movably installing the camera 3 in the terminal device, and adjusting a position of the camera 3, wherein adjusting the position of the camera 3 comprises adjusting a position of an optical centre 8 of the camera 3 by aligning a centre 9 of an external viewport 4 located on the viewport cover plate 2 with the optical centre 8 of the camera 3 to achieve concentricity.

The method in the present disclosure achieves the concentricity between the optical centre 8 of the camera 3 and the centre 9 of the external viewport 4 by additionally implementing a step of adjusting the position of the camera 3 after fixedly installing the view port cover plate 2 and movably installing the camera 3. Hence, the problem of scrapping unsatisfying terminal devices and the problem of high rejection rate in production due to severe concentricity deviation between the optical centre 8 of the camera 3 and the centre 9 of the external viewport 4 may be solved.

Obviously, the person skilled in the art could understand that the present disclosure is not limited to the rear camera 3, and could also be applied to a front camera.

FIG. 1 is a flow chart of a method for adjusting an optical centre according to an embodiment of the present disclosure. The step of adjusting the position of the camera 3 includes the following steps.

Figure 5:
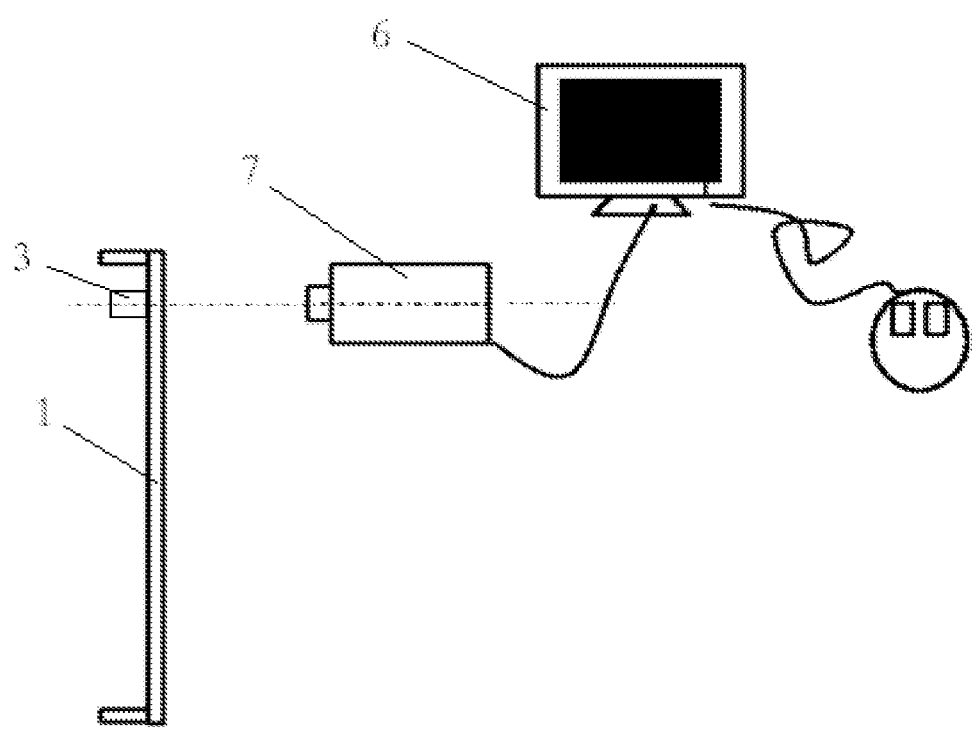
FIG. 5 is a structural schematic diagram showing that an apparatus is applied to the terminal device according to an embodiment of the present disclosure.

In step 100, referring to FIG. 5, an orthographic projection of the camera 3 and the external viewport 4 in a main view direction is obtained.

Figure 6:
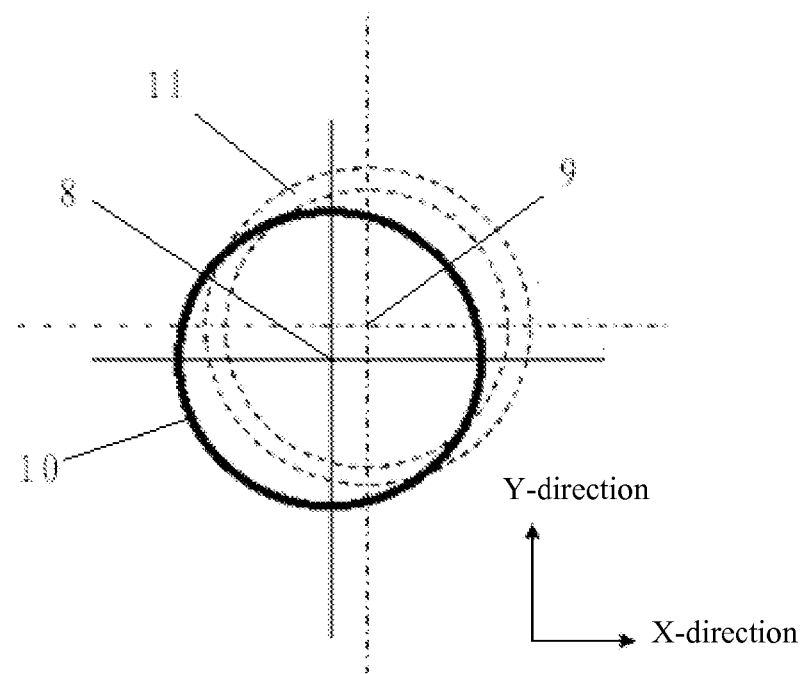
FIG. 6 is a view showing a state of an adjusting target and an adjusting area before implementing an adjustment according to an embodiment of the present disclosure.

In step 200, referring to FIG. 6, an adjusting target 10 and an adjusting area 11 are set in accordance with the obtained orthographic projection of the camera 3 and the external viewport 4.

Figure 9:
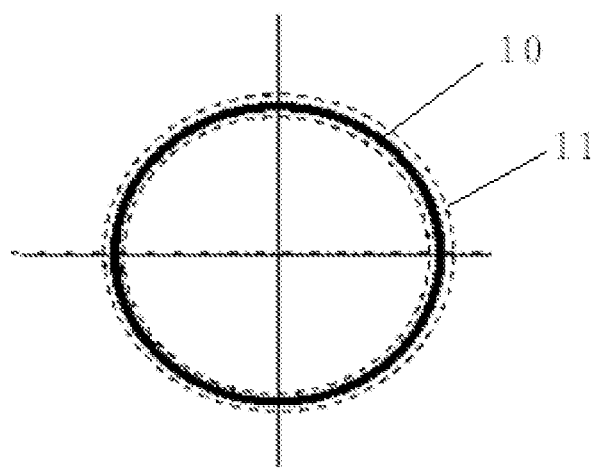
FIG. 9 is a view showing a state of the adjusting target and the adjusting area after implementing the adjustment according to the embodiment of the present disclosure.

In step 300, referring to FIG. 6, an actual position of the camera 3 is adjusted in accordance with a discretion between the adjusting target 10 and the adjusting area 11, wherein adjusting the position of the camera comprises positioning the adjusting target 10 to be located in the adjusting area 11 as shown in FIG. 9, thereby aligning the centre 9 of the external viewport 4 with the optical centre 8 of the camera 3 to achieve concentricity.

Referring to FIG. 6, for instance, in step 100, the orthographic projection of the optical centre 8 of the camera 3 and an outer diameter of the camera 3 in the main view direction is obtained, and the orthographic projection of the centre 9 of the external viewport 4 and an outer diameter of the external viewport 4 in the main view direction is obtained.

For instance, as shown in FIG. 6, in step 200, the adjusting target 10 is a circle, which is concentric with the orthographic projection of the optical centre 8 of the camera 3 in the main view direction, and a diameter of the circle is equal to the outer diameter of the external viewport 4. The adjusting area 11 is a circular ring, which is concentric with the orthographic projection of the centre 9 of the external viewport 4 in the main view direction, and an outer diameter and an interior diameter of the circular ring are respectively positive and negative position tolerance values of the outer diameter of the external viewport 4.

Still referring to FIG. 6, in step 300, the actual X-direction position and Y-direction position of the camera 3 are adjusted, in accordance with a discretion between the circle and the circular ring, until the cycle is located within an area of the circular ring as shown in FIG. 9.

As shown in FIG. 6, in step 200, the adjusting target 10 is a circle which is concentric with the orthographic projection of the optical centre 8 of the camera 3 in the main view direction, and the diameter of the circle is equal to the outer diameter of the camera 3. The adjusting area 11 is a circular ring which is concentric with the orthographic projection of the centre 9 of the external viewport 4 in the main view direction, and an outer diameter and an interior diameter of the circular ring are respectively positive and negative position tolerance values of the outer diameter of the camera 3.

Referring to FIG. 6, in step 300, the actual X-direction position and Y-direction position of the camera 3 are adjusted, in accordance with a discretion between the circle and the circular ring, until the cycle is located within an area of the circular ring as shown in FIG. 9.

FIG. 5 is an apparatus applied in the method for adjusting the optical centre according to an illustrative embodiment. The present embodiment is explained mainly using FIG. 5, but FIG. 2-FIG. 9 may be also served as references. The apparatus includes a projector 7, a computer 6, and an adjusting assembly 5. The projector 7 is configured to obtain an orthographic projection of a camera 3 and an external viewport 4 (see FIG. 2) in a main view direction, and transmit the orthographic projection to the computer 6. The computer 6 sets an adjusting target 10 (see FIG. 6) and an adjusting area 11 (see FIG. 6) in accordance with the obtained orthographic projection of the camera 3 and the external viewport 4. The adjusting assembly 5 is to adjust the actual position of the camera 3.

With the apparatus in the present disclosure, each terminal device could achieve an excellent centering effect, hence, the problem of scrapping unsatisfying terminal devices and the problem of high rejection rate in production due to severe concentricity deviation between the optical centre 8 of the camera 3 and the centre 9 of the external viewport 4 may be solved. Also, the apparatus of the present disclosure could provide an advantage of simple operation, and each terminal device can achieve an excellent centering effect through the apparatus.

Apparently, the person skilled in the art could understand that the present disclosure is not limited to the rear camera 3, and could also be applied to a front camera.

Figure 7:
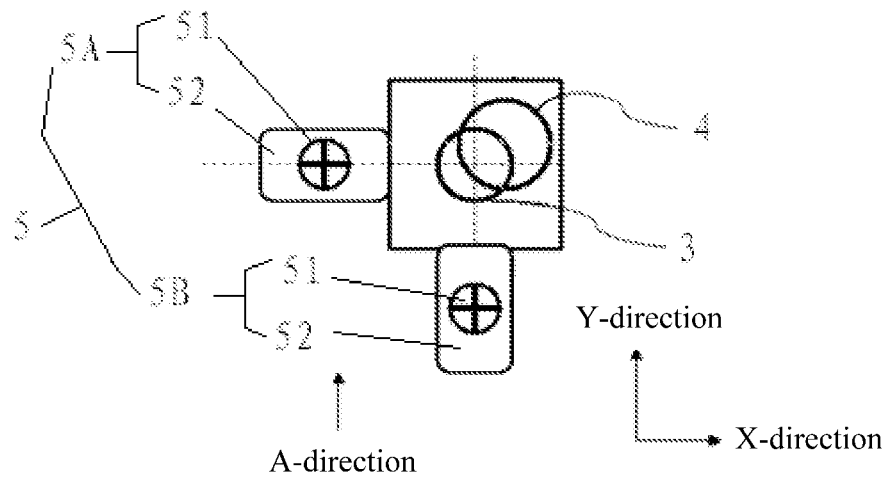
FIG. 7 is an enlarged view of the adjusting assembly and the camera according to an embodiment of the present disclosure.

For instance, as shown in FIG. 7, the adjusting assembly 5 includes two groups, i.e., an X-direction adjusting assembly 5A and a Y-direction adjusting assembly 5B. The adjusting assembly 5, i.e., the X-direction adjusting assembly 5A and the Y-direction adjusting assembly 5B are arranged with respect to a horizontal axis and a vertical axis of the optical centre 8 of the camera 3. The adjusting assembly 5, i.e., the X-direction adjusting assembly 5A and the Y-direction adjusting assembly 5B are arranged adjacent to the camera 3. The adjusting assembly 5, i.e., the X-direction adjusting assembly 5A and the Y-direction adjusting assembly 5B, are in contact with the camera 3 respectively.

Figure 8:
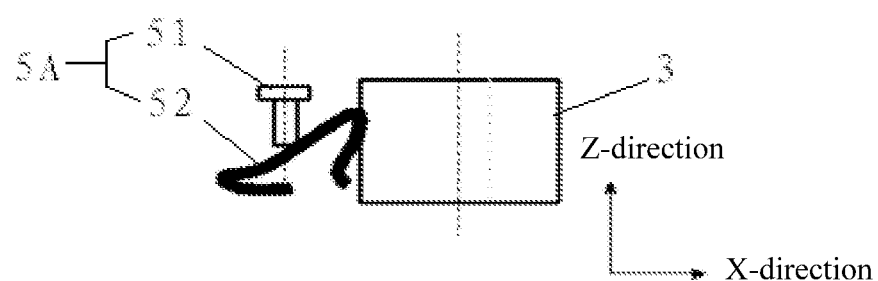
FIG. 8 is a view along a A-direction without the adjusting assembly arranged along a Y-direction in FIG. 7.

For instance, each group of the adjusting assembly, i.e., both the X-direction adjusting assembly 5A and the Y-direction adjusting assembly 5B include a screw 51 and an elastic sheet 52. The screw 51 is fixed in a housing 1. With reference to FIG. 8, the screw 51 could implement a Z-direction movement with respect to the camera 3. With the screw 51 screwing in or out, an interference between a front end of the screw 51 and the elastic sheet 52 changes, which pushes the elastic sheet 52 to deform and restore, thereby adjusting the actual position of the camera 3.

For instance, as shown in FIG. 8, the elastic sheet 52 overall is in a U-shape. One end of the elastic sheet 52 is fixed at the housing 1, and the other end presses against the camera 3. In addition, a middle portion of the elastic sheet 52 is in contact with the screw 51.

For instance, the camera 3 moves toward the right side along the X-direction when screwing in the screw 51. Conversely, the camera 3 moves toward the left side along the X-direction when screwing out the screw 51. The "left" and "right" in the present embodiment is the left and right defined on the basis of FIG. 8.

With reference to FIG. 8, the X-direction adjusting assembly 5A and the Y-direction adjusting assembly 5B are adjusted until the adjusting target 10 is located within the adjusting area 11 as shown in FIG. 9, thereby aligning a centre 9 of an external viewport 4 with the optical centre 8 of the camera 3 to achieve concentricity.

The numbering of the above embodiments of the present disclosure are only used for depiction, and not for the use of indicating the superiority and inferiority of the embodiments.

The above depictions are only for the preferred embodiments of the present disclosure, which are not to limit the present disclosure. Any variations, equivalent substitutions, and improvements made within the concept and principles of the present disclosure shall be encompassed within the scope of the present disclosure.

What is claimed is:

1. A method for adjusting an optical centre, comprising:
    fixedly installing a viewport cover plate in a terminal device;
    movably installing a camera in the terminal device; and
    adjusting a position of the camera, wherein adjusting the position of the camera comprises the steps of:
    obtaining an orthographic projection of the camera and an external viewport on the viewport cover plate in a main view direction, wherein the orthographic projection of the camera comprises an orthographic projection of the optical centre of the camera and an outer diameter of the camera in the main view direction, and the orthographic projection of the external viewport comprises an orthographic projection of the centre of an external viewport and an outer diameter of the external viewport in the main view direction;
    setting an adjusting target and an adjusting area in accordance with the orthographic projection of the camera and the external viewport; and
    adjusting the position of the camera in accordance with a discretion between the adjusting target and the adjusting area to locate the adjusting target within the adjusting area to achieve concentricity between the optical centre of the camera and the centre of the external viewport.

2. The method as claimed in claim 1, wherein in the step of setting, the adjusting target is a circle which is concentric with the orthographic projection of the optical centre of the camera in the main view direction, and a diameter of the circle is equal to the outer diameter of the external viewport; and the adjusting area is a circular ring which is concentric with the orthographic projection of the centre of the external viewport in the main view direction, and an outer diameter and an interior diameter of the circular ring are respectively positive and negative position tolerance values of the outer diameter of the external viewport.

3. The method as claimed in claim 1, wherein in the step of setting, the adjusting target is a circle which is concentric with the orthographic projection of the optical centre of the camera in the main view direction, and a diameter of the circle is equal to the outer diameter of the external viewport; and the adjusting area is a circular ring which is concentric with the orthographic projection of the centre of the external viewport in the main view direction, and an outer diameter and an interior diameter of the circular ring are respectively positive and negative position tolerance values of the outer diameter of the external viewport.

4. The method as claimed in claim 1, wherein in the step of adjusting, an X-direction position and Y-direction position of the camera are adjusted in accordance with a discretion between the circle and the circular ring, until the cycle is located within the circular ring.

5. The method as claimed in claim 1, wherein in the step of setting, the adjusting target is a circle which is concentric with the orthographic projection of the optical centre of the camera in the main view direction, and the diameter of the circle is equal to the outer diameter of the camera; and the adjusting area is a circular ring which is concentric with the orthographic projection of the centre of the external viewport in the main view direction, and an outer diameter and an interior diameter of the circular ring are respectively positive and negative position tolerance values of the outer diameter of the camera.

6. The method as claimed in claim 1, wherein in the step of setting, the adjusting target is a circle which is concentric with the orthographic projection of the optical centre of the camera in the main view direction, and the diameter of the circle is equal to the outer diameter of the camera; and the adjusting area is a circular ring which is concentric with the orthographic projection of the centre of the external viewport in the main view direction, and an outer diameter and an interior diameter of the circular ring are respectively positive and negative position tolerance values of the outer diameter of the camera.

7. The method as claimed in claim 1, wherein in the step of adjusting, an X-direction position and Y-direction position of the camera are adjusted in accordance with a discretion between the circle and the circular ring, until the cycle is located within the circular ring.

8. The method as claimed in claim 5, wherein in the step of adjusting, an X-direction position and Y-direction position of the camera are adjusted in accordance with a discretion between the circle and the circular ring, until the cycle is located within the circular ring.

9. The method as claimed in claim 6, wherein in the step of adjusting, an X-direction position and Y-direction position of the camera are adjusted in accordance with a discretion between the circle and the circular ring, until the cycle is located within the circular ring.

10. An apparatus for adjusting an optical centre, comprising:

a projector for obtaining an orthographic projection of a camera and an external viewport on a viewport cover plate in a main view direction, wherein the viewport cover plate is fixedly installed in a terminal device and the camera is movably installed in the terminal device;

a computer for setting an adjusting target and an adjusting area in accordance with the obtained orthographic projection of the camera and the external viewport; and an adjusting assembly for adjusting a position of the camera, wherein the adjusting assembly comprises two groups, which are arranged with respect to a horizontal axis and a vertical axis of the optical centre of the camera, and are arranged adjacent to the camera and each of which is in contact with the camera respectively.

11. The apparatus as claimed in claim 10, wherein each group of the adjusting assembly comprises a screw and an elastic sheet.

12. The apparatus as claimed in claim 11, wherein the screw is fixed in a housing, and the screw implements a Z-direction movement with respect to the camera, and with the screw screwing in or out, the elastic sheet is pushed to deform and restore, thereby adjusting the position of the camera.

13. The apparatus as claimed in claim 11, wherein the elastic sheet overall is in a U shape, with one end fixed at the housing, another end presses against the camera, and a middle portion is in contact with the screw.

* * * * *